US008388319B2

(12) United States Patent
Horng

(10) Patent No.: US 8,388,319 B2
(45) Date of Patent: Mar. 5, 2013

(54) STATOR DEVICE, MOTOR CONSTRUCTED THEREBY, AND HEAT-DISSIPATING FAN INCLUDING THE STATOR DEVICE

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 818 days.

(21) Appl. No.: 12/491,385

(22) Filed: Jun. 25, 2009

(65) Prior Publication Data

US 2010/0329901 A1 Dec. 30, 2010

(51) Int. Cl.
*F04B 35/04* (2006.01)
*H02K 7/08* (2006.01)
*H02K 5/16* (2006.01)

(52) U.S. Cl. .................. 417/354; 417/423.7; 417/423.1; 310/67 R; 310/90

(58) Field of Classification Search .......... 417/352–354, 417/360, 423.7, 423.15, 423.12, 423.14, 417/424.1; 310/90, 67 R; 384/903, 276, 384/295; 360/99.08, 98.07, 99.04
See application file for complete search history.

(56) References Cited

U.S. PATENT DOCUMENTS

| 4,801,831 | A | 1/1989 | Lewis |
| 4,882,832 | A | 11/1989 | Lewis |
| 5,811,903 | A | 9/1998 | Ueno et al. |
| 6,121,710 | A | 9/2000 | Ho |
| 6,376,946 | B1 | 4/2002 | Lee |
| 2004/0120833 | A1* | 6/2004 | Hsieh .............................. 417/354 |
| 2007/0284957 | A1* | 12/2007 | Horng et al. ..................... 310/90 |
| 2008/0063527 | A1* | 3/2008 | Yeh et al. ....................... 416/174 |
| 2008/0218018 | A1* | 9/2008 | Zhang et al. ..................... 310/90 |

FOREIGN PATENT DOCUMENTS

| CN | 101043156 A | 9/2007 |
| CN | 201230250 Y | 4/2009 |

* cited by examiner

*Primary Examiner* — Charles Freay
*Assistant Examiner* — Bryan Lettman
(74) *Attorney, Agent, or Firm* — Alan Kamrath; Kamrath IP Lawfirm, P.A.

(57) ABSTRACT

A stator device includes a base having a shaft tube receiving a bearing. The shaft tube includes a top end having at least one groove. A stator unit is mounted around an outer periphery of the shaft tube. The stator unit includes at least one limiting member extending through the at least one groove into the shaft tube. The at least one limiting member prevents the bearing from disengaging from the shaft tube, enhancing assembling convenience. The stator can be coupled with a rotor to form a motor with enhanced assembling convenience and enhanced rotational stability. The base can be interconnected by connecting members to a housing having air inlet and outlet sides. Vanes can be formed on the hub of the rotor to form an impeller. Thus, a heat-dissipating fan can be formed from the stator device.

32 Claims, 7 Drawing Sheets

STATOR DEVICE, MOTOR CONSTRUCTED THEREBY, AND HEAT-DISSIPATING FAN INCLUDING THE STATOR DEVICE

BACKGROUND OF THE INVENTION

1. Field of the Invention

The present invention relates to a stator device and, more particularly, to a stator device allowing easy assembly. The present invention also relates to a motor including the stator device. The present invention also relates to a heat-dissipating fan including the stator device.

2. Description of the Related Art

FIG. 1 shows a conventional motor 9 including a base 91, a rotor 92, and a stator unit 93. The base 91 includes a shaft tube 911 receiving a bearing 96, a retainer ring 94, and a support 95 serving as a reservoir for receiving lubricant. The rotor 92 includes a shaft 921 rotatably extending through the bearing 96. The retainer ring 94 is engaged in an annular groove 922 formed in an outer periphery of the shaft 921 and adjacent a distal end of the shaft 921 rotatably supported by the support 95. The stator unit 93 is mounted around the shaft tube 911 for driving the rotor 92 to rotate.

However, leakage of lubricant occurs through a gap between the shaft 921 and the bearing 96 during rotation of the shaft 921 relative to the bearing 96. Noise and wear to the shaft 921 occur accordingly. Furthermore, dust in the air accumulates on the top face of the bearing 96, adversely affecting the shaft 921 and the bearing 96. Further, a certain length L must be preserved for forming the annular groove 922 in the shaft 921 for the purposes of receiving the retainer ring 94 that prevents disengagement of the shaft 921. Thus, the outer periphery of the shaft 921 is not supported by the bearing 96 at the portion having the annular groove 922. The rotational stability of the rotor 92 can not be enhanced, which is a problem for a miniature motor. Further, it is difficult to confirm reliable mounting of the shaft 921, the bearing 96, and the retainer ring 94 inside the shaft tube 911. Namely, the quality control of assembly of the motor can not be easily achieved, leading to inconvenient assembly.

SUMMARY OF THE INVENTION

An objective of the present invention is to provide a stator device including a stator unit having a limiting member extending through a groove in a shaft tube of a base into the shaft tube, preventing disengagement of a bearing mounted in the shaft tube and, thus, providing assembling convenience.

Another objective of the present invention is to provide a motor including the stator unit having the limiting member extending through the groove in the shaft tube of the base into the shaft tube, preventing disengagement of the bearing mounted in the shaft tube and, thus, providing assembling convenience.

A further objective of the present invention is to provide a stator device and a motor including the stator device. An abutting plate is mounted in the shaft tube of the stator device, and the limiting member presses against the abutting plate to prevent disengagement of the bearing and the rotor, so that the motor has a better positioning effect.

Still another objective of the present invention is to provide a stator device and a motor including the stator device. An abutting plate is mounted in the shaft tube of the stator device to enhance prevention of lubricant leakage.

Yet another objective of the present invention is to provide a stator device and a motor including the stator device. An abutting plate is mounted in the shaft tube of the stator device to prevent dust from accumulating on top of the bearing.

Still another objective of the present invention is to provide a stator device and a motor including the stator device. An abutting plate is mounted in the shaft tube of the stator device, and the limiting member presses against the abutting plate to avoid movement of the abutting plate in a horizontal direction in the shaft tube, avoiding wear and noise due to contact between the abutting plate and the shaft during rotation of the shaft.

Yet another objective of the present invention is to provide a heat-dissipating fan including any one of the above-mentioned stator devices. The base is interconnected by a plurality of connecting members to a housing. The hub of the rotor includes a plurality of vanes to form an impeller. The heat-dissipating fan includes the advantages of the stator devices and provides the best heat-dissipating effect.

A stator device according to the preferred teachings of the present invention includes a base having a shaft tube in a center thereof. The shaft tube receives a bearing. The shaft tube includes a top end having at least one groove. A stator unit includes an assembling hole extending along an axis. The stator unit is mounted around an outer periphery of the shaft tube with the assembling hole receiving the shaft tube. The stator unit includes at least one limiting member extending through the at least one groove into the shaft tube. The at least one limiting member prevents the bearing from disengaging from the shaft tube, enhancing the assembling convenience of the stator unit.

A motor according to the preferred teachings of the present invention includes a base having a shaft tube in a center thereof. The shaft tube receives a bearing. The shaft tube includes a top end having at least one groove. A rotor includes a shaft at a center thereof. The shaft is rotatably extended through the bearing and rotatable about an axis. A stator unit includes an assembling hole extending along the axis. The stator unit is mounted around an outer periphery of the shaft tube with the assembling hole receiving the shaft tube. The stator unit includes at least one limiting member extending through the at least one groove into the shaft tube. The at least one limiting member prevents the bearing from disengaging from the shaft tube, enhancing assembling convenience and rotational stability of the motor.

The base can be interconnected by a plurality of connecting members to a housing having an air inlet side and an air outlet side. The hub of the rotor can include a plurality of vanes to form an impeller. Thus, a heat-dissipating fan can be formed from the stator device.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
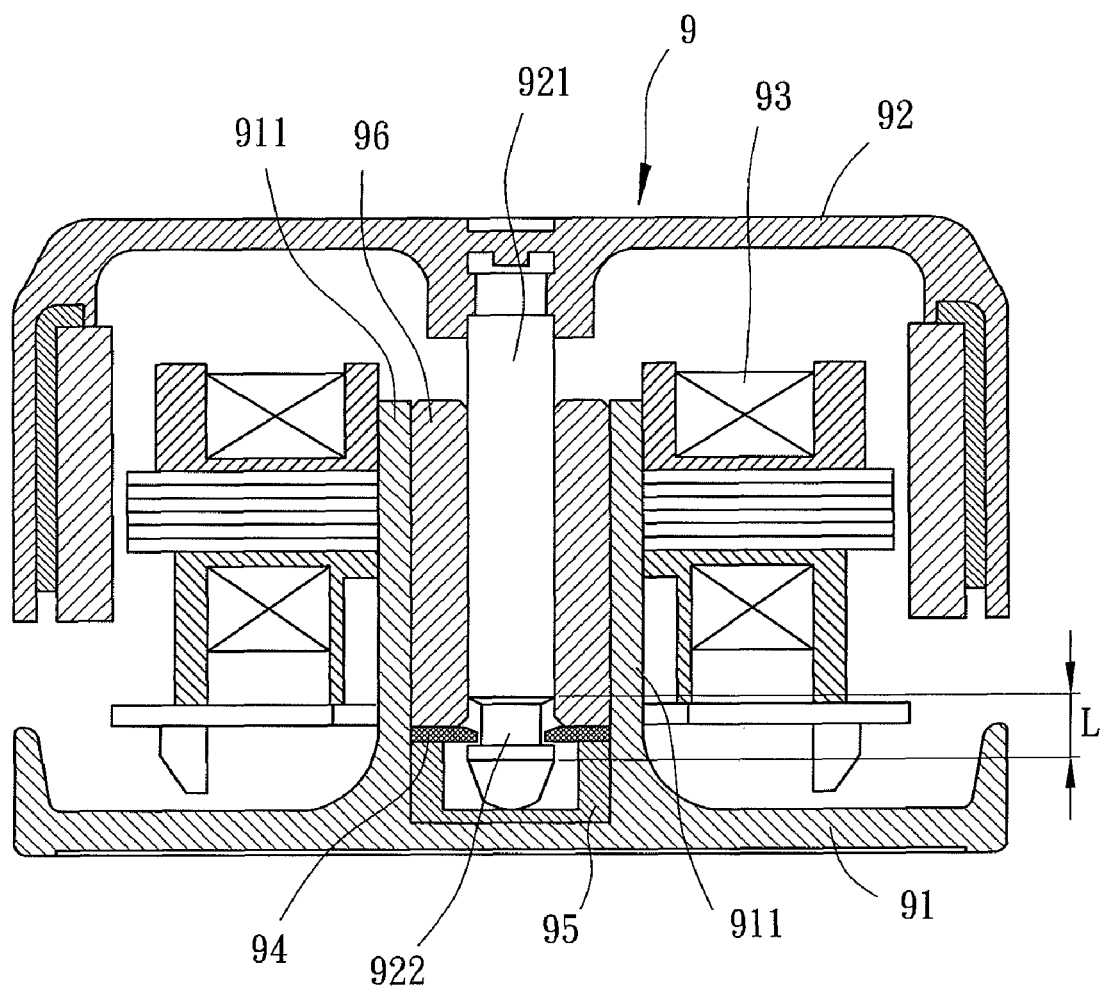
FIG. 1 shows a perspective view of a conventional motor.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "upper", "lower", "top", "bottom", "inner", "outer", "end", "portion", "section", "axial", "radial", "horizontal", "annular", "outward", "inward", "length", "width", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
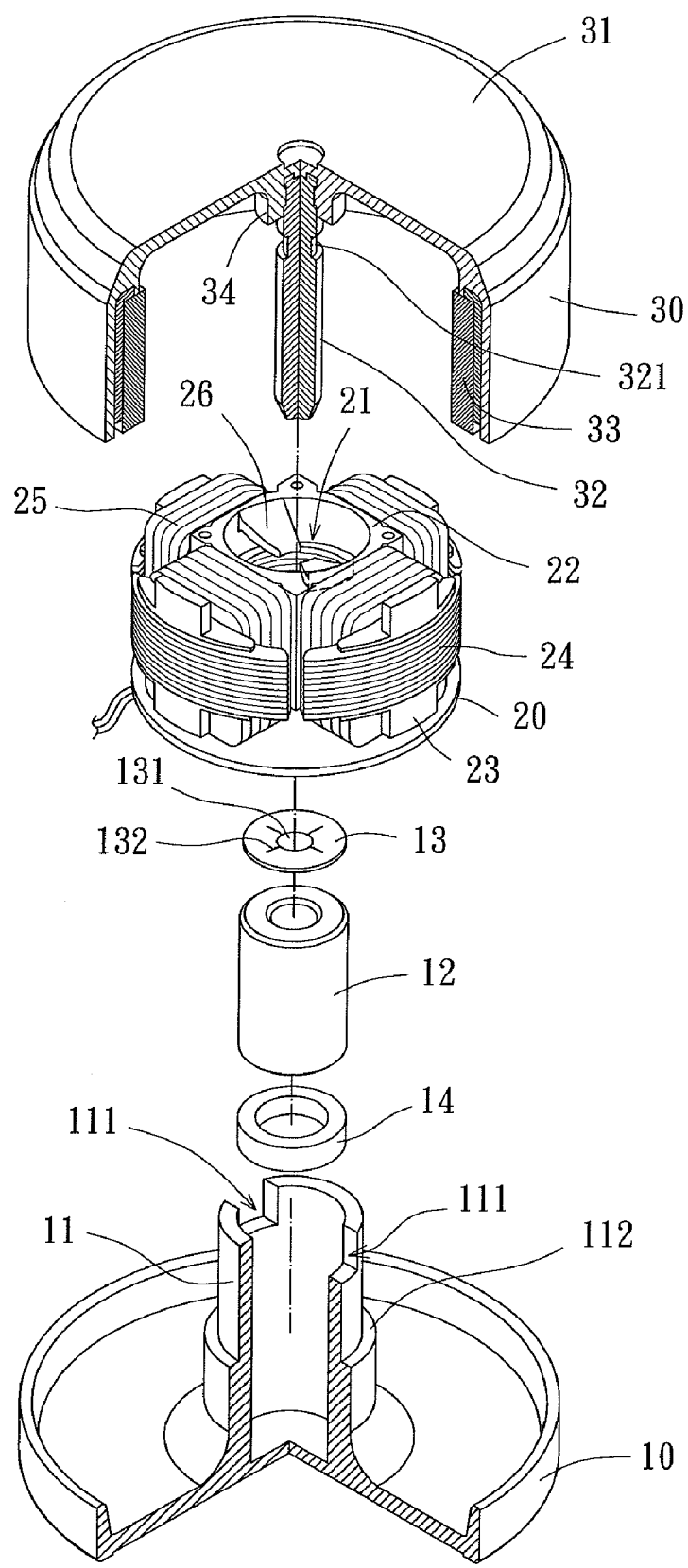
FIG. 2 shows an exploded, perspective view of a motor of a first embodiment according to the preferred teachings of the present invention.
Figure 3:
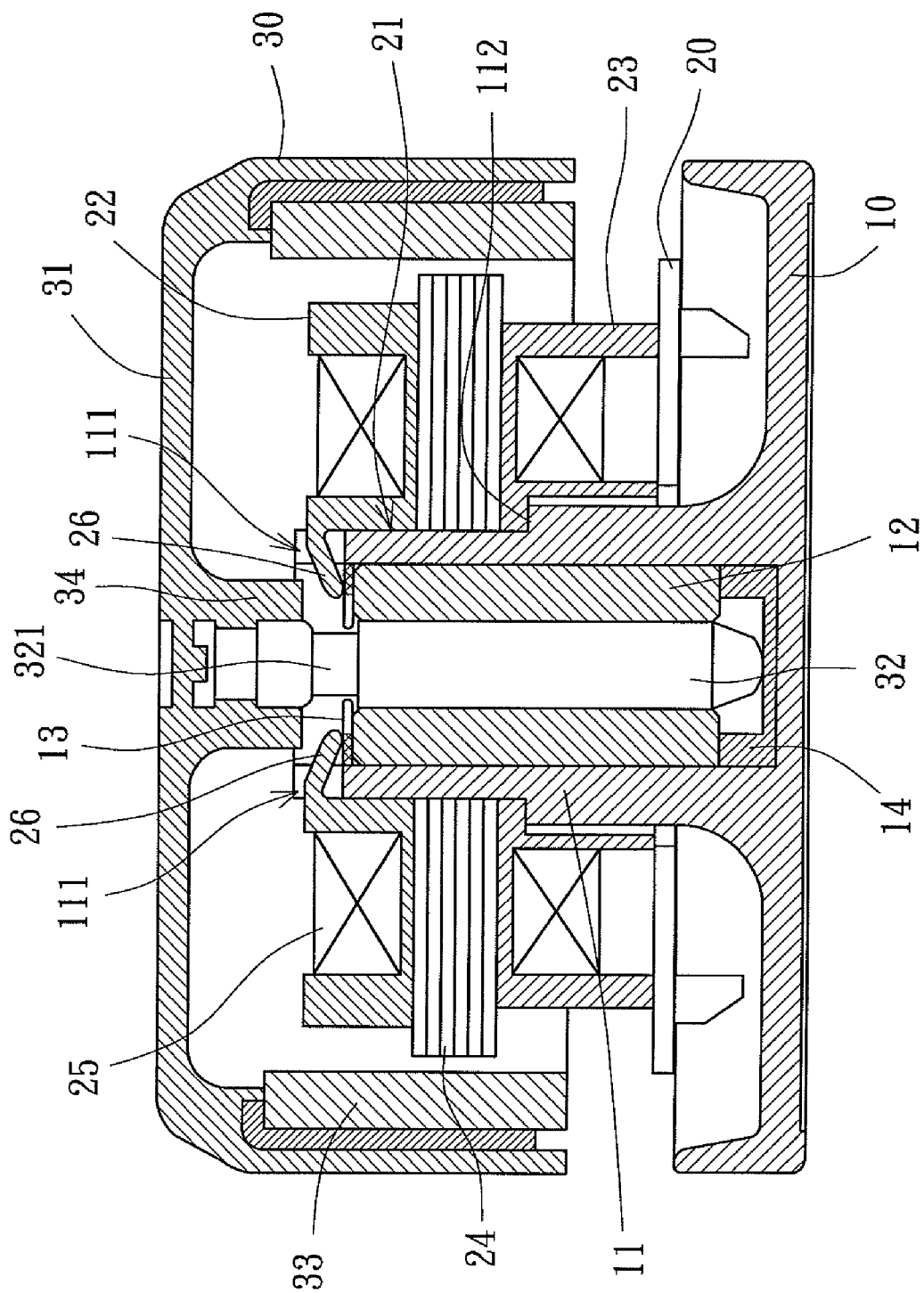
FIG. 3 shows a cross sectional view of the motor of FIG. 2.
Figure 4:
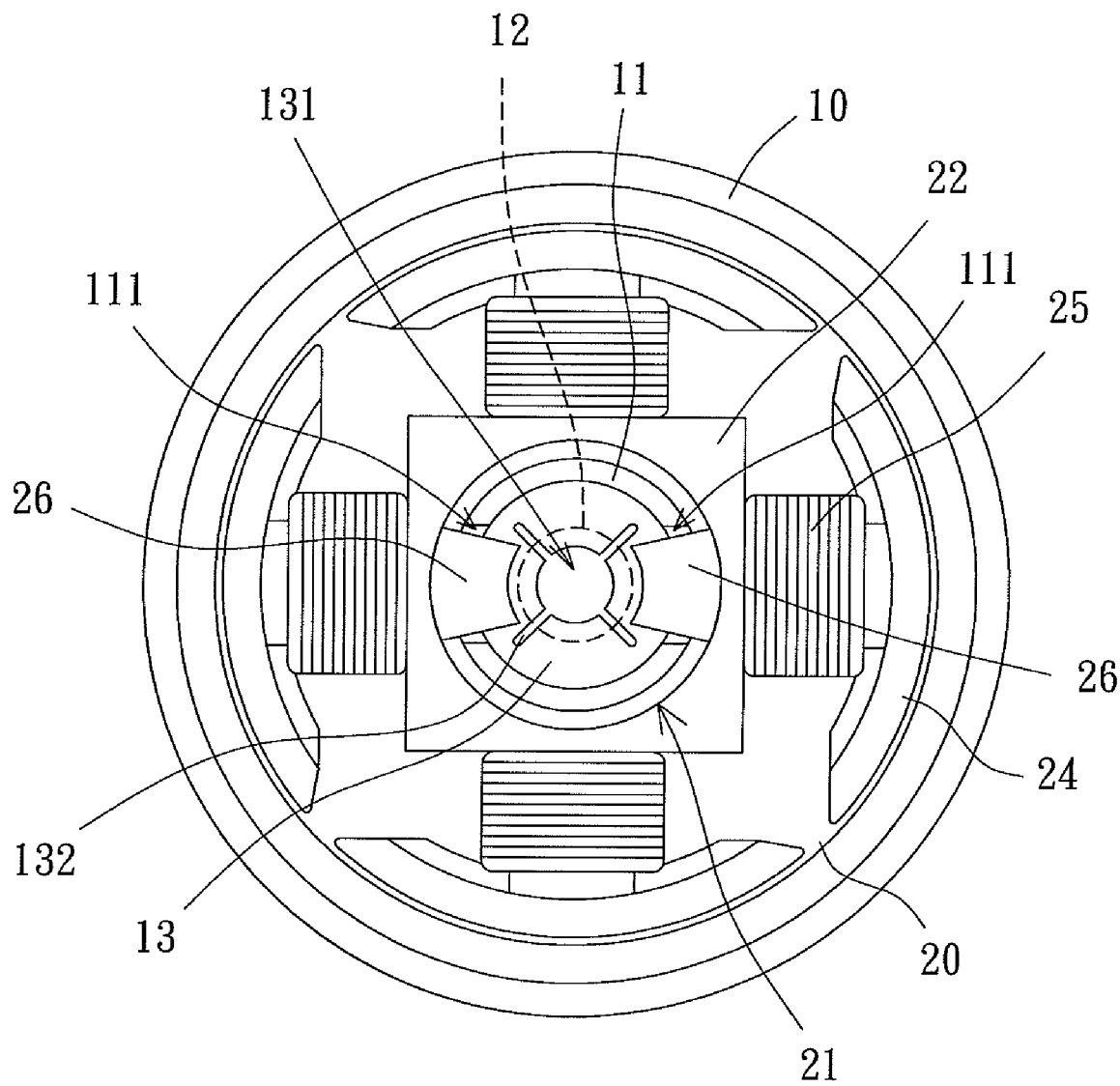
FIG. 4 shows a top view of the motor of FIG. 2.

A motor of a first embodiment according to the preferred teachings of the present invention is shown in FIGS. 2-4 of the drawings. The motor includes a stator device and a rotor 30 rotatably mounted to the stator device about an axis. The stator device includes a base 10 and a stator unit 20. The base 10 includes a shaft tube 11 in a center thereof. Preferably, the shaft tube 11 has a closed bottom end. The shaft tube 11 receives a bearing 12, an abutting plate 13 and a support 14 serving as a reservoir for receiving lubricant. The shaft tube 11 further includes a top end having two grooves 111 in the form of two notches in a top face of the shaft tube 11. Each groove 111 includes a width in a horizontal direction perpendicular to the axis. However, the shaft tube 11 can include only one groove 111 or more than two grooves 111 according to the teachings of the present invention. An outer periphery of the shaft tube 11 includes a positioning section 112 shown as a shoulder formed by two portions having different outer diameters. However, the positioning section 112 can be of other forms and shapes according to the teachings of the present invention. The bearing 12 is a self-lubricating bearing. However, the bearing 12 can be a ball bearing.

The abutting plate 13 has cross sections corresponding to the shaft tube 11. In this embodiment, the abutting plate 13 is circular and has an outer diameter substantially the same as an inner diameter of the shaft tube 11. When the abutting plate 13 is placed on top of the bearing 12, the abutting plate 13 prevents leakage of the lubricant out of the shaft tube 11 and prevents accumulation of dust at the top of the bearing 12. The abutting plate 13 includes a through-hole 131 extending along the axis. The through-hole 131 includes an inner periphery. A plurality of slits 132 extends outward from the inner periphery of the through-hole 131 along a radial direction perpendicular to the axis. The slits 132 provide the inner periphery of the through-hole 131 with elasticity, so that a shaft 32 of the rotor 30 can easily extend through the through-hole 131 of the abutting plate 13.

The stator unit 20 includes an assembling hole 21, an upper insulating sleeve 22, a lower insulating sleeve 23, a plurality of silicon steel plates 24, a metal coil 25, and two limiting members 26. The silicon steel plates 24 are sandwiched between the upper and lower insulating sleeves 22 and 23. The metal coil 25 is wound around the upper and lower insulating sleeves 22 and 23. The metal coil 25 shown in FIGS. 2-4 is of a radial winding type. However, the metal coil 25 can be of an axial winding type. The limiting members 26 protrude radially inward from an inner periphery of the assembling hole 21 along a radial direction perpendicular to the axis.

Each limiting member 26 extends through one of the grooves 111 of the shaft tube 11. In the preferred form shown in FIGS. 2-4, the limiting members 26 extend from the upper insulating sleeves 22 into the assembling hole 21 and are engaged in the grooves 111. Furthermore, each limiting member 26 has a length in the horizontal direction not larger than the width of the grooves 111, preventing rotation of the stator unit 20 relative to the shaft tube 11. A distal end of each limiting member 26 is located in the shaft tube 11 and presses against the abutting plate 13 (or the top of the bearing 12, if the abutting plate 13 is not utilized), preventing the rotor 30 and the bearing 12 from disengaging from the shaft tube 11. The stator unit 20 can be mounted around the shaft tube 11 with the assembling hole 21 receiving the outer periphery of the shaft tube 11. Furthermore, the stator unit 20 can be fixed in an axial position along the axis due to provision of the positioning section 112 on the outer periphery of the shaft tube 11. Further, the assembling hole 21 of the stator unit 20 and the outer periphery of the shaft tube 11 can be fixed together such as by tight coupling, bonding, or other suitable provisions, further assuring reliable assembly between the stator unit 20 and the shaft tube 11. Although the stator unit 20 shown in FIGS. 2-4 includes two limiting members 26, a single one limiting member 26 or more than two limiting members 26 corresponding to the number of the grooves 111 can be utilized according to the teachings of the present invention.

The rotor 30 includes a hub 31 having a coupling seat 34 in a center thereof. An annular magnet 33 is mounted to the hub 31. The shaft 32 has an end fixed to the coupling seat 34. The shaft 32 is rotatably extended through the abutting plate 13 and the bearing 12, and the other end of the shaft 32 abuts the support 14. Thus, the rotor 30 is rotatably supported by the bearing 12 to rotate above the base 10. The shaft 32 further includes a reduced portion forming an annular groove 321 distant to the other end of the shaft 32. An inner periphery of the through-hole 131 of the abutting plate 13 is engaged in the annular groove 321, so that the shaft 32 is positioned by the abutting plate 13. Thus, the outer periphery of the shaft 32 at the other end of the shaft 32 is rotatably received in the bearing 12, enhancing the rotational stability of the rotor 30. It can be appreciated that the through-hole 131 of the abutting plate 13 has a diameter smaller than an outer diameter of the shaft 32 and slightly larger than an outer diameter of the reduced portion.

With reference to FIGS. 3 and 4, the support 14, the bearing 12, and the abutting plate 13 are placed into the shaft tube 11 in sequence. The stator unit 20 is around the shaft tube 11 with the assembling hole 21 receiving the outer periphery of the shaft tube 11. Furthermore, the stator unit 20 is fixed by the positioning section 112 in a preset axial position along the axis. In this state, the limiting members 26 of the stator unit 20 are engaged in the grooves 111 of the shaft tube 11, and the distal ends of the limiting members 26 protrude into the shaft tube 11 and press against the abutting plate 13. Since the stator unit 20 has been fixed by suitable provisions to the outer periphery of the shaft tube 11, the limiting members 26 and the abutting plate 13 can effectively prevent the rotor 30 and the bearing 12 from disengaging from the shaft tube 11. Furthermore, since the limiting members 26 of the stator unit 20 are engaged in the grooves 111 of the shaft tube 11, the limiting members 26 can reliably retain the abutting plate 13 on the top of the bearing 12, avoiding movement of the abutting plate 13 in the shaft tube 11 in the horizontal direction perpendicular to the axis. Thus, friction and noise resulting from undesired contact between the abutting plate 13 and the shaft 32 during rotation of the shaft 32 can be avoided.

Since the other end of the shaft 32 of the rotor 30 extends through the abutting plate 13 and the bearing 12 of the stator unit 20 and abuts the support 14 and since the inner periphery of the through-hole 131 of the abutting plate 13 engages in the annular groove 321 of the shaft 32, the limiting members 26 and the abutting plate 13 can reliably position the bearing 12 and the rotor 30, preventing the bearing 12 and the rotor 30 from disengaging from the shaft tube 11.

When the stator unit 20 is mounted around the outer periphery of the shaft tube 11, the positioning section 112 of the shaft tube 11 provides a positioning effect for the stator unit 20 along the axis, avoiding the axial position of the stator unit 20 to be too high or too low and assuring pressing of the limiting members 26 against the abutting plate 13 and the bearing 12 and, thus, assuring engagement of the abutting plate 13 in the annular groove 321 of the shaft 32. Thus, the positioning section 112 of the shaft tube 11 assures the functions provided by the limiting members 26 and enhances the assembling convenience of the stator unit 20.

After the shaft 32 of the rotor 30 is rotatably extended through the bearing 12, since the top end of the shaft tube 11 includes the grooves 111 in which the limiting members 26 of the stator unit 20 are engaged, the shaft tube 11 provides a protecting wall having a suitable height along the axis. The protecting wall allows insertion of the coupling seat 34 of the rotor 30 and provides the best effect preventing entrance of dust and preventing leakage of the lubricant.

Figure 5:
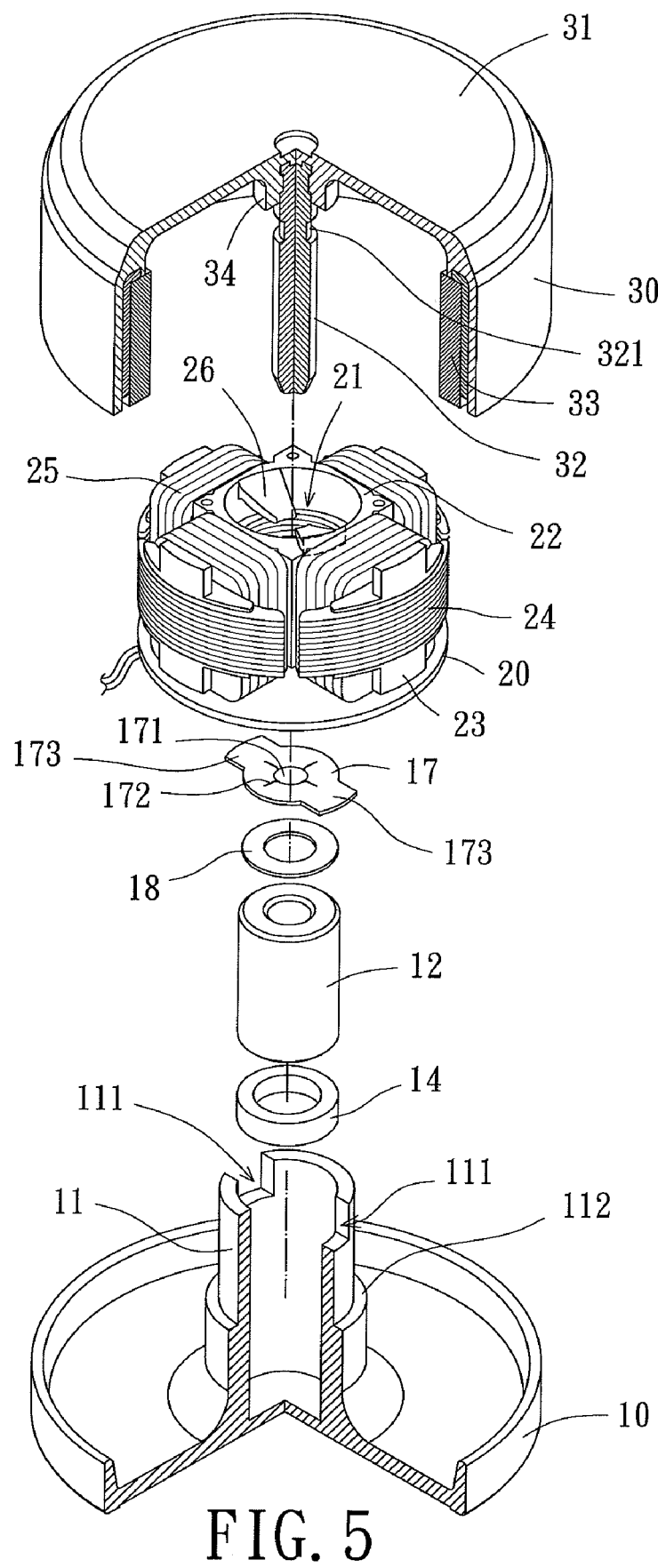
FIG. 5 shows an exploded, perspective view of a second embodiment according to the preferred teachings of the present invention.
Figure 6:
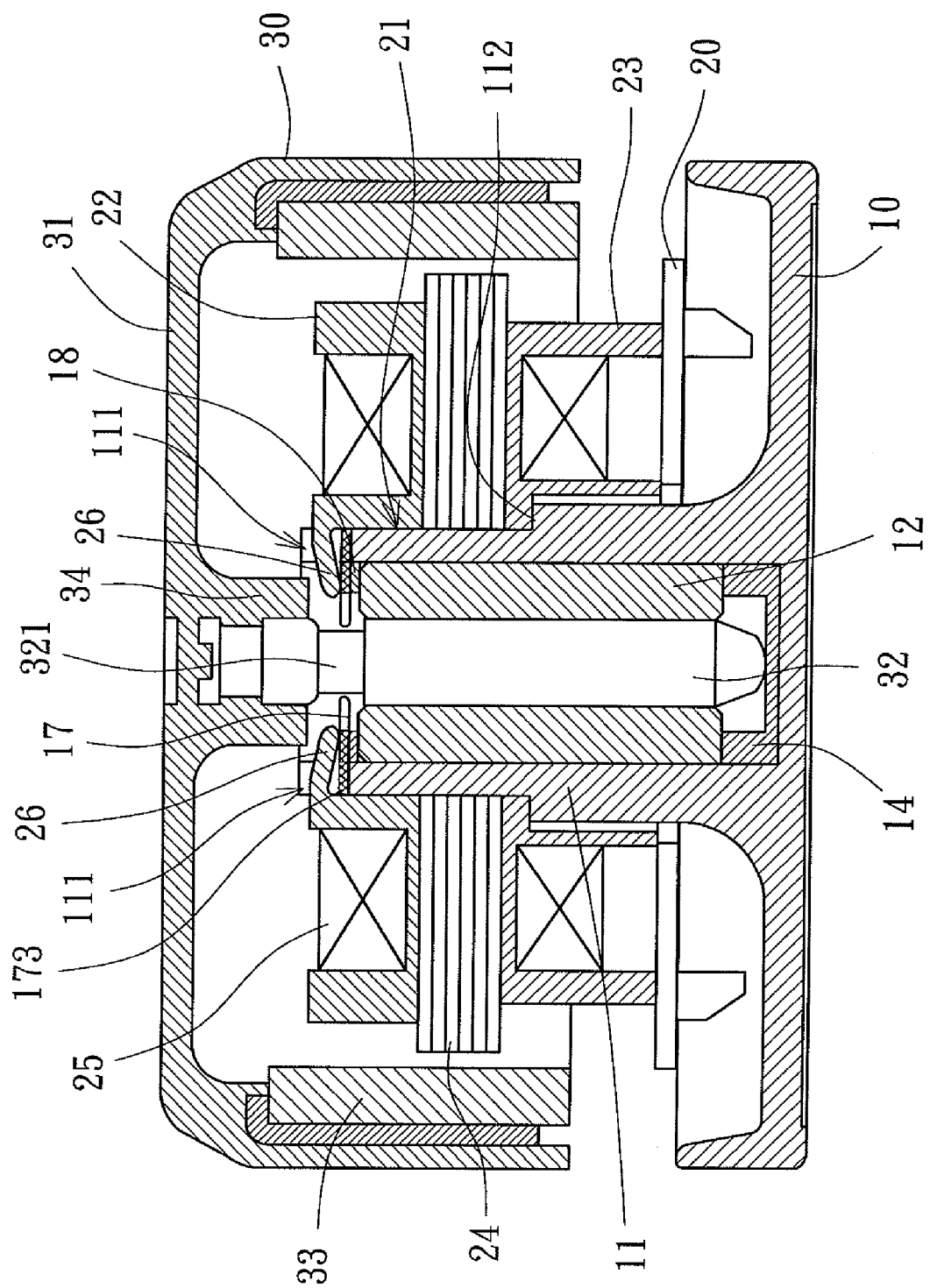
FIG. 6 shows a cross sectional view of the motor of FIG. 5.

FIGS. 5 and 6 show a motor of a second embodiment according to the preferred teachings of the present invention. The motor of this embodiment also includes a base 10, a stator unit 20, and a rotor 30 that are substantially the same as those of the first embodiment and, thus, not described in detail to avoid redundancy. In this embodiment, the abutting plate 17 includes a through-hole 171 extending along the axis and having an inner periphery. A plurality of slits 172 extends outward from the inner periphery of the through-hole 171 along a radial direction perpendicular to the axis. The slits 172 provide the inner periphery of the through-hole 171 with elasticity, so that the shaft 32 of the rotor 30 can easily extend through the through-hole 171 of the abutting plate 17. The abutting plate 17 further includes two lugs 173 extending outward in a radial direction perpendicular to the axis and each lug 173 having a maximum width in the horizontal direction not larger than the width of the grooves 111. Each lug 173 further has a length in the radial direction not extending beyond the outer diameter of the shaft tube 11. Thus, a better positioning effect is provided between the abutting plate 17 and the shaft tube 11. One or more washers 18 can be mounted between the abutting plate 17 and bearing 12. The abutting plate 17 shown in FIG. 5 includes two lugs 173. However, the abutting plate 17 can include a single lug 173 or more than two lugs 173 corresponding to the number of the grooves 111 according to the teachings of the present invention.

Figure 7:
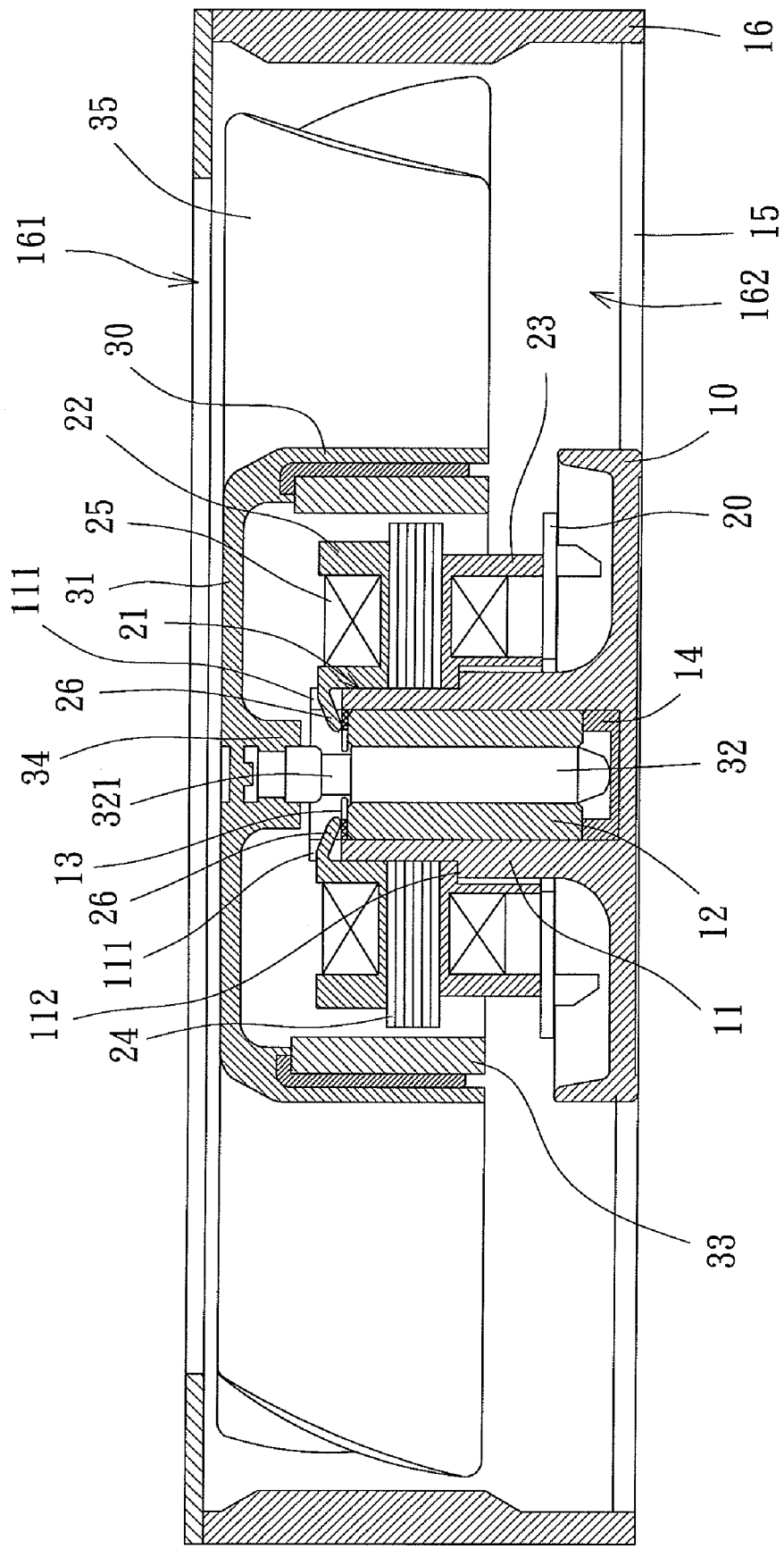
FIG. 7 shows a cross sectional view of a heat-dissipating fan utilizing the motor of FIG. 2.

FIG. 7 shows a heat-dissipating fan including the motor of FIGS. 2-4. Specifically, the base 10 is interconnected to a housing 16 by a plurality of connecting members 15 in the form of ribs or stationary vanes. The housing 16 includes an air inlet side 161 and an air outlet side 162. The rotor 30 includes a plurality of vanes 35 formed on an outer periphery of the hub 31 to form an impeller. Thus, when the rotor 30 rotates, the vanes 35 drive air currents to flow from the air inlet side 161 to the air outlet side 162, and the connecting members 15 provide a pressure-increasing effect. It can be appreciated that the motor of FIGS. 5 and 6 can be utilized to form a heat-dissipating fan by similar arrangement shown in FIG. 7.

As mentioned above, the limiting members 26 according to the preferred teachings of the present invention not only prevents disengagement of the rotor 30 but also positions the stator unit 20 by engaging with the grooves 111 of the shaft tube 11, avoiding rotation of the stator unit 20 relative to the shaft tube 11 and providing an enhanced positioning effect between the stator unit 20 and the base 10.

In a case the shaft tube 11 of the base 10 includes the positioning section 112 on the outer periphery thereof, the limiting members 26 can press against the bearing to avoid disengagement of the bearing 12 or the rotor 30 resulting from a high assembly position of the stator unit 20 mounted to the base 10. The assembling convenience of the stator unit 20 can be further enhanced.

Since the top end of the shaft tube 11 includes the grooves 111 in which the limiting members 26 of the stator unit 20 are engaged, the shaft tube 11 provides a protecting wall having a suitable height above the bearing 12 along the axis. The protecting wall prevents movement or leakage of the lubricant out of the shaft tube 11 and prevents dust from entering the shaft tube 11 and from accumulating on the top of the bearing 12.

In cases the abutting plate 13, 17 is mounted in the shaft tube 11, the abutting plate 13, 17 not only engages with the annular groove 321 of the shaft 32 for preventing disengagement of the bearing 12 and the rotor 30 but also prevents movement or leakage of the lubricant out of the shaft tube 11. Noise and wear between the shaft 32 and the bearing 12 resulting from leakage of the lubricant will not occur.

The lugs 173 of the abutting plate 17 engage with the grooves 111 of the shaft tube 11 to better position the abutting plate 17, avoiding movement of the abutting plate 17 relative to the shaft tube 11 of the base 10.

The abutting plate 13, 17 further avoids accumulation of dust on the top of the bearing 12.

The washer 18 between the abutting plate 17 and the bearing 12 allows a positioning effect by indirect contact between the abutting plate 17 and the bearing 12.

Since the top end of the shaft tube 11 includes the grooves 111 in which the limiting members 26 of the stator unit 20 are engaged, the shaft tube 11 provides a protecting wall having a suitable height above the bearing 12 along the axis. The protecting wall allows insertion of the coupling seat 34 of the rotor 30. Furthermore, the protecting wall prevents movement or leakage of the lubricant out of the shaft tube 11 and prevents dust from entering the shaft tube 11 and from accumulating on the top of the bearing 12.

The base 10 can be interconnected by the connecting members 15 to the housing 16, and the rotor 30 includes the vanes 35 on the outer periphery of the hub 31 to form a heat-dissipating fan having the above-mentioned advantages while providing the best heat-dissipating effect.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A motor comprising:
 a base including a shaft tube in a center thereof, with the shaft tube having an outer periphery, an inner periphery and a top end, with the shaft tube receiving a bearing surrounded by the inner periphery, with the top end having at least one groove extending from the outer periphery to the inner periphery;
 a rotor including a shaft at a center thereof, with the shaft rotatably extending through the bearing and rotatable about an axis; and
 a stator unit including an assembling hole extending along the axis, with the stator unit mounted around the outer periphery of the shaft tube with the assembling hole receiving the shaft tube, with the stator unit including at least one limiting member integrally extending from an inner periphery defining the assembling hole, with the at least one limiting member extending through said at least one groove into the shaft tube, with said at least one limiting member preventing the bearing from disengaging from the shaft tube.

2. The motor as claimed in claim 1, further comprising: an abutting plate received in the shaft tube, with the abutting plate including a through-hole, with the shaft rotatably extending through the through-hole, with the abutting plate located on top of the bearing, and with the limiting member pressing against the abutting plate.

3. The motor as claimed in claim 2, with the outer periphery of the shaft including a reduced portion to form an annular groove, with the through-hole of the abutting plate having an inner periphery received in the annular groove.

4. The motor as claimed in claim 3, with the through-hole of the abutting plate having a diameter smaller than an outer diameter of the shaft and slightly larger than an outer diameter of the reduced portion.

5. The motor as claimed in claim 2, with the abutting plate including at least one lug extending outward in a radial direction perpendicular to the axis, with said at least one lug engaged in said at least one groove of the shaft tube.

6. The motor as claimed in claim 5, with said at least one lug having a length in the radial direction not extending beyond an outer diameter of the shaft tube.

7. The motor as claimed in claim 2, with the through-hole of the abutting plate including a plurality of slits extending outward from an inner periphery of the through-hole in a radial direction perpendicular to the axis.

8. The motor as claimed in claim 1, with the stator unit including the assembling hole, an upper insulating sleeve, a lower insulating sleeve, a plurality of silicon steel plates sandwiched between the upper and lower insulating sleeves, a metal coil, and said at least one limiting member, with said at least one limiting member extending from the upper insulating sleeve into the assembling hole.

9. The motor as claimed in claim 1, with the outer periphery of the shaft tube including a positioning section, and with the stator unit mounted to the positioning section in a fixed position along the axis.

10. The motor as claimed in claim 1, with said at least one limiting member engaged in said at least one groove of the shaft tube, and with said at least one limiting member having a width in a horizontal direction perpendicular to the axis not larger than a width of said at least one groove in the horizontal direction.

11. The motor as claimed in claim 1, further comprising: a support mounted in the shaft tube and below the bearing, with an end of the shaft abutting the support.

12. A heat-dissipating fan comprising:
 a base including a shaft tube in a center thereof, with the shaft tube having an outer periphery, an inner periphery and a top end, with the shaft tube receiving a bearing surrounded by the inner periphery, with the top end having at least one groove extending from the outer periphery to the inner periphery;
 a housing interconnected to the base by a plurality of connecting members; an impeller including a hub, with the hub including a plurality of vanes formed on an outer periphery thereof, with the hub further including a coupling seat and a shaft coupled to the coupling seat, with the shaft rotatably extending through the bearing and rotatable about an axis; and
 a stator unit including an assembling hole extending along the axis, with the stator unit mounted around the outer periphery of the shaft tube with the assembling hole receiving the shaft tube, with the stator unit including at least one limiting member integrally extending from an inner periphery defining the assembling hole, with the at least one limiting member extending through said at least one groove into the shaft tube, with said at least one limiting member preventing the bearing from disengaging from the shaft tube.

13. The heat-dissipating fan as claimed in claim 12, further comprising:
 an abutting plate received in the shaft tube, with the abutting plate including a through-hole, with the shaft rotatably extending through the through-hole, with the abutting plate located on top of the bearing, and with the limiting member pressing against the abutting plate.

14. The heat-dissipating fan as claimed in claim 13, with the outer periphery of the shaft including a reduced portion to form an annular groove, and with the through-hole of the abutting plate having an inner periphery received in the annular groove.

15. The heat-dissipating fan as claimed in claim 14, with the through-hole of the abutting plate having a diameter smaller than an outer diameter of the shaft and slightly larger than an outer diameter of the reduced portion.

16. The heat-dissipating fan as claimed in claim 13, with the abutting plate including at least one lug extending outward in a radial direction perpendicular to the axis, and with said at least one lug engaged in said at least one groove of the shaft tube.

17. The heat-dissipating fan as claimed in claim 16, with said at least one lug having a length in the radial direction not extending beyond an outer diameter of the shaft tube.

18. The heat-dissipating fan as claimed in claim 13, with the through-hole of the abutting plate including a plurality of slits extending outward from an inner periphery of the through-hole in a radial direction perpendicular to the axis.

19. The heat-dissipating fan as claimed in claim 12, with the outer periphery of the shaft tube including a positioning section, and with the stator unit mounted to the positioning section in a fixed position along the axis.

20. The heat-dissipating fan as claimed in claim 12, with said at least one limiting member engaged in said at least one groove of the shaft tube, with said at least one limiting member having a width in a horizontal direction perpendicular to the axis not larger than a width of said at least one groove in the horizontal direction.

21. The heat-dissipating fan as claimed in claim 12, further comprising:
 a support mounted in the shaft tube and below the bearing, with an end of the shaft abutting the support.

22. The heat-dissipating fan as claimed in claim 12, with the connecting members including a plurality of ribs or a plurality of stationary vanes.

23. A heat-dissipating fan comprising:
   a base including a shaft tube in a center thereof, with the shaft tube receiving a bearing, with the shaft tube including a top end having at least one groove, with the shaft tube further including an outer periphery;
   a housing interconnected to the base by a plurality of connecting members;
   an impeller including a hub, with the hub including a plurality of vanes formed on an outer periphery thereof, with the hub further including a coupling seat and a shaft coupled to the coupling seat, with the shaft rotatably extending through the bearing and rotatable about an axis; and
   a stator unit including an assembling hole extending along the axis, with the stator unit mounted around the outer periphery of the shaft tube with the assembling hole receiving the shaft tube, with the stator unit including at least one limiting member extending through said at least one groove into the shaft tube, with said at least one limiting member preventing the bearing from disengaging from the shaft tube, with the stator unit including the assembling hole, an upper insulating sleeve, a lower insulating sleeve, a plurality of silicon steel plates sandwiched between the upper and lower insulating sleeves, a metal coil, and said at least one limiting member, with said at least one limiting member extending from the upper insulating sleeve into the assembling hole.

24. A stator device comprising:
   a base including a shaft tube in a center thereof, with the shaft tube having an outer periphery, an inner periphery and a top end, with the shaft tube receiving a bearing surrounded by the inner periphery, with the top end having at least one groove extending from the outer periphery to the inner periphery; and
   a stator unit including an assembling hole extending along an axis, with the stator unit mounted around the outer periphery of the shaft tube with the assembling hole receiving the shaft tube, with the stator unit including at least one limiting member integrally extending from an inner periphery defining the assembling hole, with the at least one limiting member extending through said at least one groove into the shaft tube, with said at least one limiting member preventing the bearing from disengaging from the shaft tube.

25. The stator device as claimed in claim 24, further comprising: an abutting plate received in the shaft tube, with the abutting plate including a through-hole, with the shaft rotatably extending through the through-hole, with the abutting plate located on top of the bearing, and with the limiting member pressing against the abutting plate.

26. The stator device as claimed in claim 25, with the abutting plate including at least one lug extending outward in a radial direction perpendicular to the axis, and with said at least one lug engaged in said at least one groove of the shaft tube.

27. The stator device as claimed in claim 26, with said at least one lug having a length in the radial direction not extending beyond an outer diameter of the shaft tube.

28. The stator device as claimed in claim 25, with the through-hole of the abutting plate including a plurality of slits extending outward from an inner periphery of the through-hole in a radial direction perpendicular to the axis.

29. The stator device as claimed in claim 24, with the stator unit including the assembling hole, an upper insulating sleeve, a lower insulating sleeve, a plurality of silicon steel plates sandwiched between the upper and lower insulating sleeves, a metal coil, and said at least one limiting member, with said at least one limiting member extending from the upper insulating sleeve into the assembling hole.

30. The stator device as claimed in claim 24, with the outer periphery of the shaft tube including a positioning section, and with the stator unit mounted to the positioning section in a fixed position along the axis.

31. The stator device as claimed in claim 24, with said at least one limiting member engaged in said at least one groove of the shaft tube, with said at least one limiting member having a width in a horizontal direction perpendicular to the axis not larger than a width of said at least one groove in the horizontal direction.

32. The stator device as claimed in claim 24, further comprising: a support mounted in the shaft tube and below the bearing.

* * * * *